Jan. 13, 1970     E. BEREK     3,489,059

ROCKET-LAUNCHER MAGAZINE

Filed April 12, 1968     6 Sheets-Sheet 1

EBERHARD BEREK, INVENTOR

By Werdenoth, Lind & Ponack, Attorneys

Jan. 13, 1970    E. BEREK    3,489,059
ROCKET-LAUNCHER MAGAZINE
Filed April 12, 1968    6 Sheets-Sheet 4

EBERHARD BEREK, INVENTOR

By Wenderoth Lind & Ponack
attorneys

Jan. 13, 1970  E. BEREK  3,489,059
ROCKET-LAUNCHER MAGAZINE
Filed April 12, 1968  6 Sheets-Sheet 5

EBERHARD BEREK, INVENTOR

By Wenderoth, Lind & Ponack, Attorneys

Jan. 13, 1970  E. BEREK  3,489,059

ROCKET-LAUNCHER MAGAZINE

Filed April 12, 1968  6 Sheets-Sheet 6

EBERHARD BEREK, INVENTOR

By Wenderoth, Lind & Ponack, Attys

United States Patent Office 3,489,059
Patented Jan. 13, 1970

3,489,059
ROCKET-LAUNCHER MAGAZINE
Eberhard Berek, Zurich, Switzerland, assignor to Werkzeugmaschinenfabrik Oerlikon Buhrle & Co., Zurich, Switzerland
Filed Apr. 12, 1968, Ser. No. 720,809
Claims priority, application Switzerland, Apr. 13, 1967, 5,186/67
Int. Cl. F41f 9/06, 3/04
U.S. Cl. 89—1.801       2 Claims

ABSTRACT OF THE DISCLOSURE

A rocket-launcher magazine having a housing and a feed mechanism for conveying the rockets through the housing. A loading member in said housing is movable between a loading position and a delivery position for receiving rockets successively when in loading position and for transferring them to the feed mechanism when in delivery position. The loading member is formed as a trough and swings into and out of the delivery position. Means are provided for guiding the rockets in an axial direction from the rear of the housing when the loading member is in loading position. Means for pivoting the loading member from loading position to delivery position is controlled by the feed mechanism. The trough extends in the direction of the rockets transferred to the feed mechanism and has a cross section in the form of a sector of a circle. The line of force G of the weight of the loaded trough produces, relatively to the pivoting axis of the loading member a moment in the direction of the delivery position. A second loading trough is located in the housing in front of a loading aperture and means are provided for swinging said first named trough into a position coaxial with said second trough.

---

This invention relates to a rocket-launcher magazine wherein a movable member receives rockets in succession during loading and transfers them to a feed mechanism.

An object of the invention is to provide a magazine wherein the rockets being loaded are easily aligned even though long and heavy.

A further object of the invention is to provide means whereby the loading of the magazine is easily accomplished and the rocket-launcher is quickly in readiness for action.

A further object is to provide a magazine wherein during loading any danger to the rockets preventing reliable functioning is prevented.

A still further object of the invention is to provide a loading member formed as a trough which may be swung into and out of the delivery position and which guides the rockets in an axial direction when introduced from the rear of the magazine housing.

A still further object is to provide pivoting means for the loading member controlled by the feed mechanism.

A still further object is to provide means whereby the transfer of rockets to the feed mechanism is assured in correct rhythm.

With the above and other objects in view which will become apparent from the detailed description below, a preferred embodiment of the invention is shown in the drawings in which.

Figure 1:
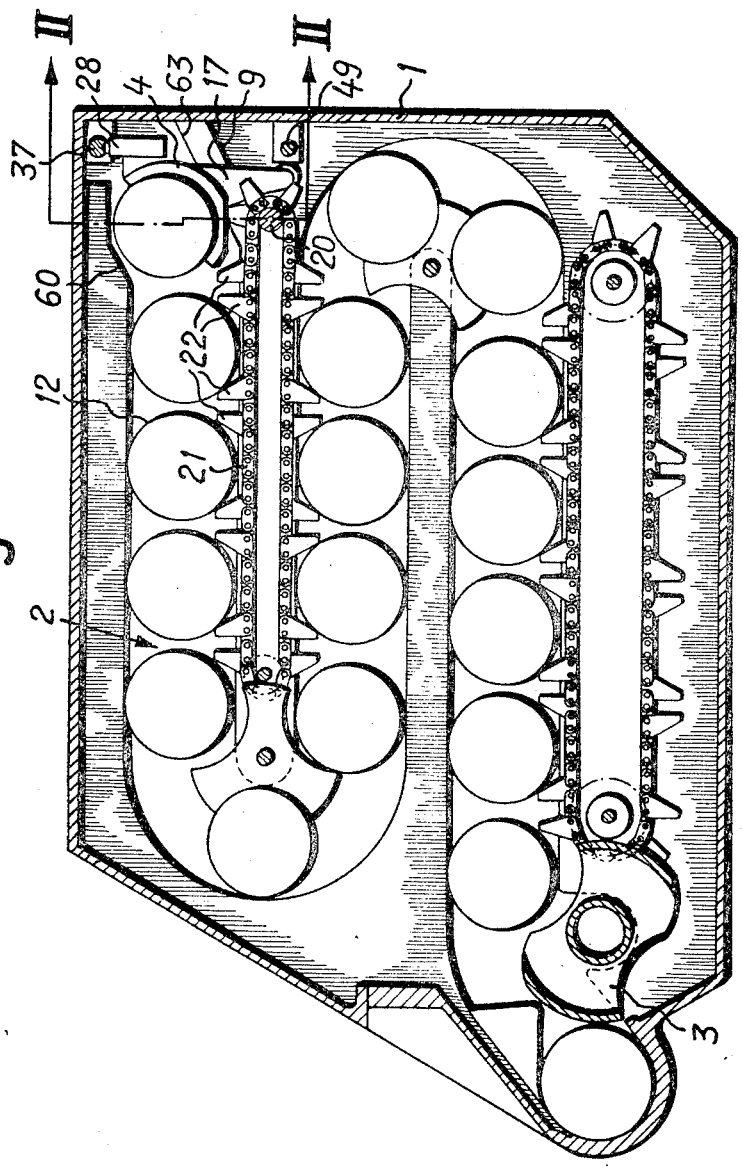
FIGURE 1 shows a cross-section through a rocket-launcher magazine on the section line I—I of FIGURE 2.

The rocket launcher as shown in FIGURE 1 consists essentially of the magazine 2, the launching mechanism and the housing 1 surrounding these parts. The parts forming the launching mechanism, namely the conveyor roller 3, which are situated with the closing flaps not illustrated in the drawing adjacent to the loading chamber, are described and illustrated in detail in the Swiss patent specification No. 347,734. Furthermore, the feed mechanism for the rockets forms the subject of the Swiss patent specification No. 409,703.

Figure 2:
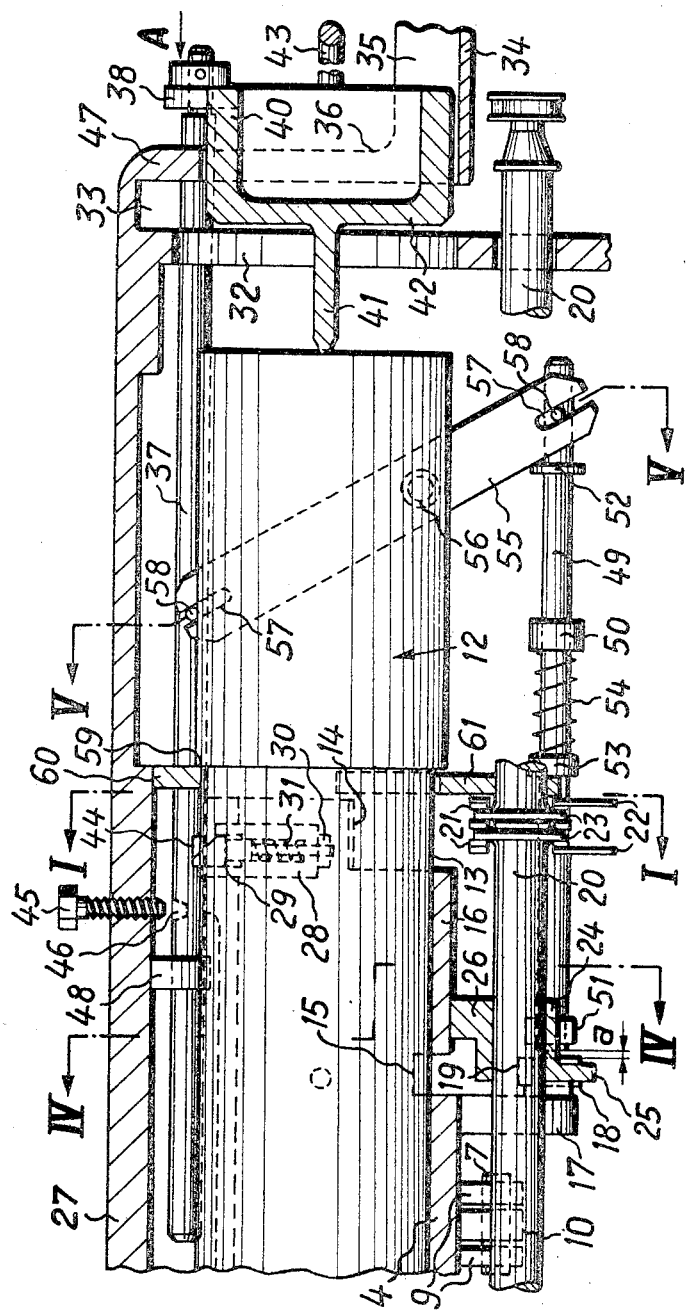
FIGURE 2 is a partial longitudinal section, on the section line II—II in FIGURE 1, for the loading position of the rammer.
Figure 4:
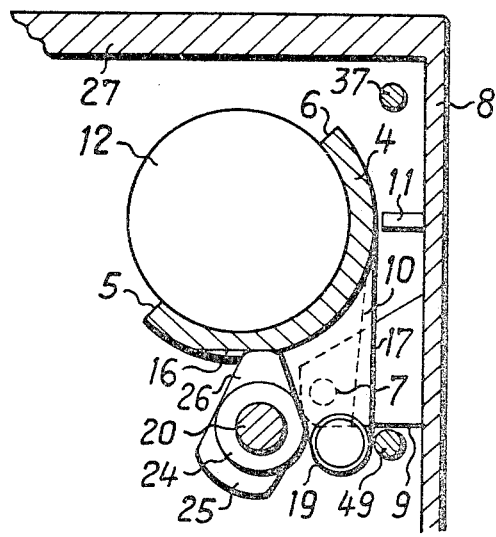
FIGURE 4 is a section on the section line IV—IV in FIGURE 2.
Figure 5:
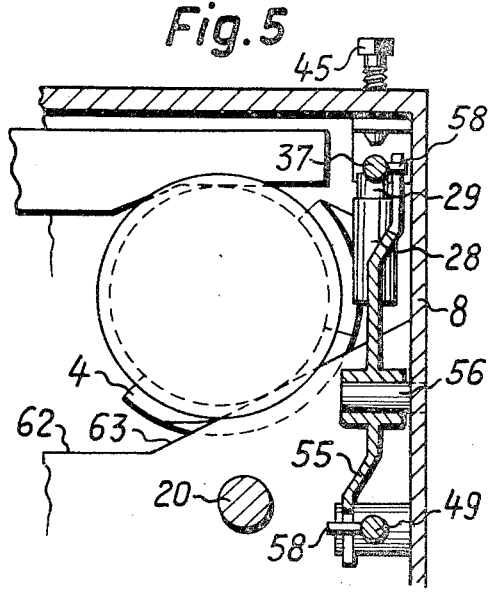
FIGURE 5 is a section on the section line V—V in FIGURE 2.

In FIGURE 2, the rear end of a trough-shaped loading member 4 is illustrated, hereinafter termed swinging trough. This swinging trough 4 should have a cross-section in the form of a sector of a circle and, in the present example, has a cross-section in the form of a semi-circular ring and is pivoted about a pin 7 (FIGURE 4). This pin 7 is mounted in two brackets 9 connected to the housing wall 8 and engages through a strap 10 secured to the swinging trough 4. In the loading position illustrated in FIGURE 4, the swinging trough 4 bears against a stop member 11 projecting from the wall 8 of the housing so that the vertical through the axis of the trough, on which the centers of the semicircular cross-sections lie, falls on the trough. In the example illustrated, a diameter of a cross-section connecting the two edges 5, 6 of the swinging trough 4 forms an angle of 45 degrees with this vertical. The swinging trough 4 is adapted to receive rockets 12 and has an internal diameter which is equal to the diameter of the part 13 thereof following, to the fore, on the tail of the rocket. The vertical passing through the center of gravity of the assembly of swinging trough 4 and rocket 12 does not intersect the pivotal axis of the swinging trough. The swinging trough 4 comprises a recess 14 extending from its end and furthermore a slot 15 incised from its edge 5.

Between the recess 14 and the slot 15, a face 16 is milled on the swinging trough 4 from the surface. The normals on this face 16 do not intersect the pivotal axis of the swinging trough 4; they are situated at the same lower side of the pivotal axis as the verticals through the center of gravity of swinging trough 4 and rocket 12. Connected to the swinging trough 4, as FIGURE 4 shows, is a downwardly extending arm 17 on the end of which there is mounted a locking mechanism in the form of a roller 19 mounted on a pin 18 extending parallel thereto. Keyed onto the shaft 20, which is likewise directed parallel to the swinging trough 4 and on which there are mounted pairs of chain wheels 23 serving for the drive of the conveyor chains 21 provided with flight attachments 22, is a control member 24 which carries two cams 25 and 26 situated substantially opposite one another with respect to the axis of the shaft 20. The cam 25, which is constructed in the form of a flat member, lies in the plane which is formed by the plane of symmetry of the trough slot 15 and the roller 19; furthermore, the cam 26 is situated below the face 16 of the swinging trough 4.

The swinging trough 4 carries a snap mechanism in the form of a sleeve 28 which is directed perpendicular to the cover 27 of the housing when the trough is in the loading position and in which a bolt 29 is mounted for displacement. A stop member 30, which is connected to this bolt 29, projecting upwards from the holder constructed in the form of a sleeve 28, bears against the bottom of the sleeve 28 under the pressure of a spring 31 supported on the one hand on the bolt 28 and on the other hand on the bottom of the sleeve bore.

The front ends of the swinging trough 4 and of the shaft 20 are in mirror-image of the rear ends of these parts illustrated in the drawing, except that there the locking bolt 29 is absent. The two ribs 60 and 61, serving to guide the rocket 12, are connected to the housing wall 8. The lower rib 61 rises from its part 62 directed parallel to the conveyor chain 21 to the housing wall 8, this inclined portion being designated by 63 in the drawing.

Figure 6:
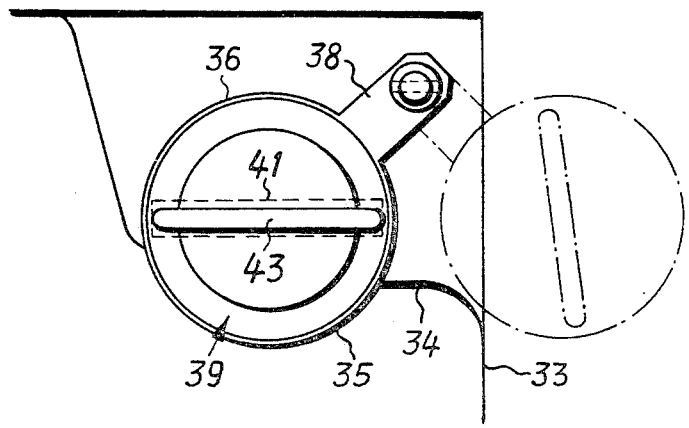
FIGURE 6 is a view in the direction of the arrow A in FIGURE 2.

The rear portion of the housing 1 is separated from the front portion by means of a partition 32 and contains the drive members for the feed mechanism of the magazine. As FIGURES 2 and 6 show, this rear housing portion 33 is lower at one side than at the other side. The cover 34 of this lower housing portion is constructed in the form of a rounded loading trough 35, the axis of the cylinder of which this trough 35 forms a part and the axis of a circular loading aperture 36 in the rear wall, coinciding with the longitudinal axis of the swinging trough 4 when it is in the loading position. The diameter of aperture 36 and of the trough 35 in front of this corresponds to that of the tail portion of the rockets 12 to be stacked in the magazine.

A rod 37 which passes through the partition wall 32 and projects to the rear from the housing portion 33 is mounted for displacement in a bracket 48 connected to the housing wall 8 and furthermore in the rear wall 47 of the housing. The rod 37 is disposed below the cover 27 of the housing and aligned parallel to the swinging trough 4. An arm 38, which is pivotally mounted on the end of this rod 37, is connected to a rammer sleeve 39 representing a loading aid. The rammer 39 consists of a sleeve 40 which is closed at the front by a head and the external diameter of which is equal to the diameter of the trough 35. Connected to the head 42 is a prismatic member 41 which projects forwards and the width of which corresponds to the external diameter of the rearmost portion of the rocket 12. A bow-shaped handle 43 is secured to the annular end face of the rammer 39.

Figure 3:
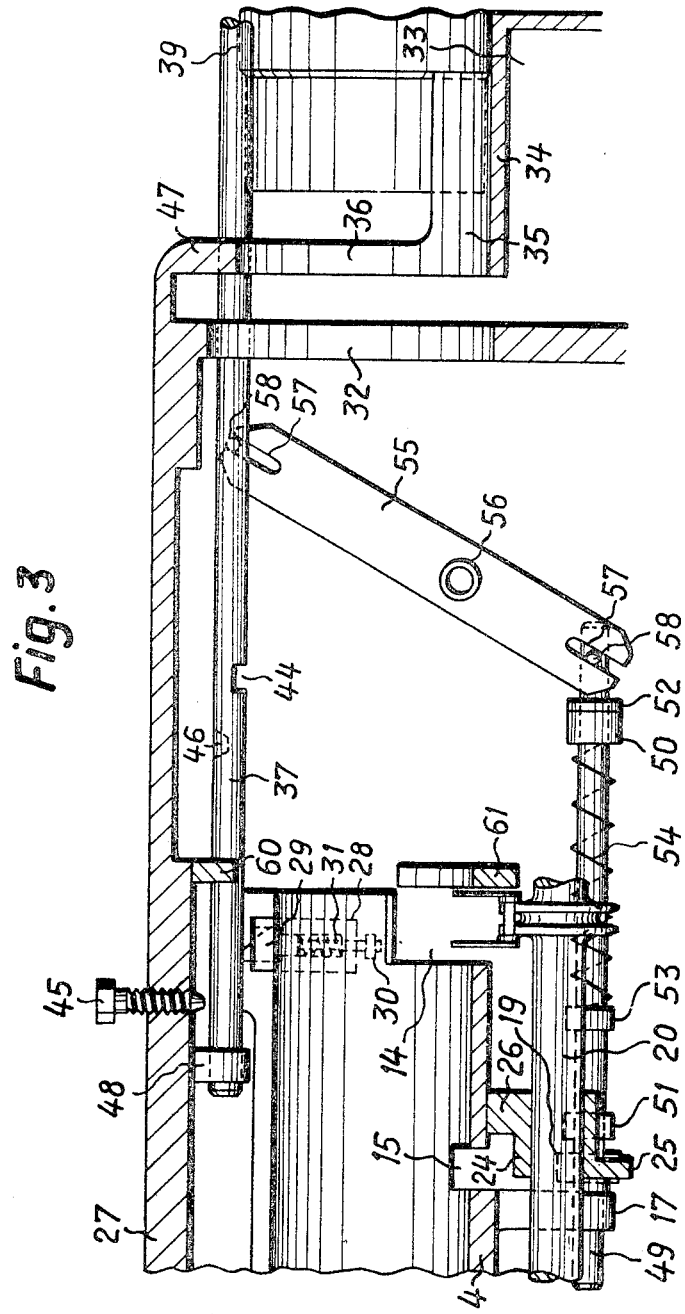
FIGURE 3 is a view corresponding to FIGURE 2, for the position of rest of the rammer.

Cut out of the underside of the rod 37, as FIGURE 3 shows, is a groove 44 directed transversely to its axis. The conically-shaped end, projecting into the housing 1, of a set screw 45 adjustable in the cover 27 of the housing is adapted to engage in a correspondingly shaped bore 46 in the rod 37.

A further rod 49, which extends parallel to the one referred to above, is mounted for displacement below the swinging trough 4 in two brackets 50 and 51 connected to the housing wall 8. Stretched between one of two rings 52 and 53 secured one at each side of the bracket 50 on the rod 49, and the bracket 50, is a spring 54 which thus tends to displace the rod 49 towards the left (seen in FIGURES 2 and 3). Two pins 58, which are connected to the two rods 37 and 49, engage in the slotted ends 57 of a lever 55 pivotally mounted on a shaft 56 connected to the housing wall 8. The axis of the rod 49 lies in a plane which is directed perpendicular to the housing wall 8 and which likewise contains the axis of the roller 19 when the swinging trough 4 is in the loading position. Furthermore, the rod 49 is adapted in such a manner that the arm 17 of the swinging trough 4 and the roller 19 do not project into its area of movement in this position.

Figure 7:
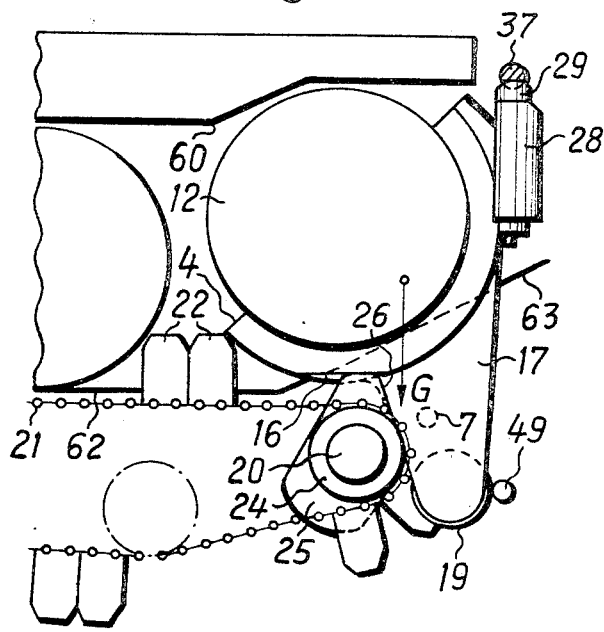
FIGURE 7 is a partial diagrammatic showing of the loading member in loading position.

The construction described operates as follows:

At the beginning of the loading of the magazine 2 with rockets 12 from the rear thereof, the swinging trough 4 is held in the loading position by the cam 26 of the control member 24 acting on its face 16, as FIGURE 7 shows. The front end of the rod 49, which is urged, by the spring 54, into its front end position determined by the bearing of the ring 52 against the bracket 50, lies in front of the rear end face of the roller 19 (FIGURE 3). The rammer 39, which is in a position indicated in chain line in FIGURE 6, in which it bears against an edge of the housing 33 outside the trough 35, is located in the loading position shown in FIGURE 3 by the rod 37 held in the rear end position by the lever 55.

The rocket 12, which at first lies with its front end in the trough 35, is held on this in alignment with the swinging trough 4 while it is pushed towards and on to this and at the same time is guided by it. When the rear end of the rocket 12 has reached the housing wall 32, the rammer 39 is pivoted about the rod 37 into the ramming position as shown in FIGURE 6 in which it bears against the trough 35 and is guided by this in its movement. By means of the rammer 39, which is moved by the operator and the extension 41 of which bears against the end face of the rocket 12, the rocket is pushed forwards until its shoulder 59 formed by the reduction in diameter abuts against the guide ribs 60, 61 here acting as stops. During this movement of the rammer 39, the rod 37 is also moved forwards and, by means of the lever 55 which is in driving connection with this, the rod 49 is pulled backwards against the pressure of the spring 54, into the rear end position in which that plane which contains its end face is situated at a short distance $a$ behind the rear end face of the plane containing the roller 19. When the rod 37 has reached the front end position and hence the rocket 12 has reached its loading position in the swinging trough 4, the locking bolt 29 of the snap mechanism (28–31) snaps into the groove 44 in the rod under the pressure of the spring 31 and so secures the control linkage 37, 49, 55 against further movement (FIGURE 2). If the rammer 39 is released before the rocket 12 has reached this loading position and the locking of the control linkage can be effected, the spring 54 again urges the rod 49 forwards and the rod 37 with the rammer 39 towards the rear. This indicates that the rocket 12 has not been conveyed into the loading position. By means of a crank handle, not illustrated in the drawing, the feed mechanism, and hence the shaft 20 on which the control member 24 is mounted, is now driven. As a result, the cam 26 is turned away from the supporting face 16 of the swinging trough 4 (FIGURE 8) so that this can tilt in counterclockwise direction (seen in FIGURE 7) under the effect of a moment which is determined by its own weight and that of the rocket 12 and which acts on the swinging trough 4 with respect to the pin 7. In the course of this, the rocket 12 is guided out of the swinging trough 4 while it travels downwards along the inclined portion 63 of the guide rib 61. When the lower, inner edge 5 of the trough has reached the level of the portion 62 of the guide rib 61, the rocket 12 no longer rests on the swinging trough 4 but on this portion 62 of the rib 61 and, in addition, it bears at the front, seen in the direction of conveying, against a flight attachment 22 connected to the conveyor chain 21, whereupon a further flight attachment 22 abuts against it from the rear and displaces it forwards. During the further rotation of the shaft 20 and movement of the rocket 12, the swinging trough 4, bearing with its face 16 against the cylindrical hub of the rotating control member 14, remains immobile until the cam 26 again strikes against the face 16 (FIGURE 9). During its further rotation, the cam 26 restores the swinging trough 4 to the loading position illustrated in FIGURE 7.

Figure 8:
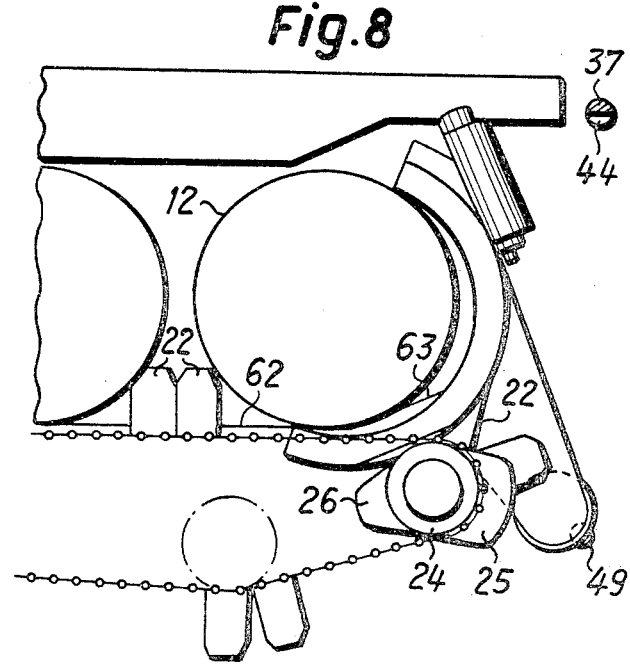
FIGURE 8 is a similar view showing the parts in delivery position.
Figure 9:
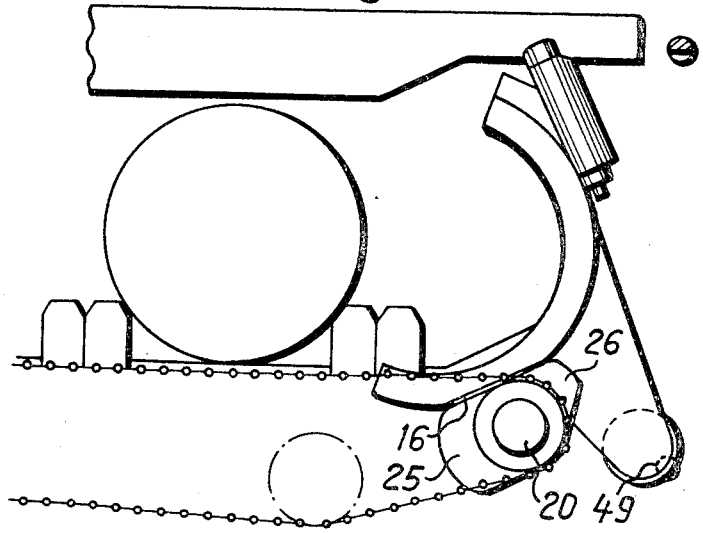
FIGURE 9 is a similar view showing the position of the parts after the rocket has been transferred to the feed mechanism.

If, for any reason, the swinging trough 4 is not displaced out of its loading position under the action of the weight acting thereon, it is nevertheless pivoted, that is to say tilted, because in this case the cam 25 of the control member 24 strikes, during its rotation, against the roller 19 of the arm 17, which is within its range of movement, and so urges the swinging trough 4 in counterclockwise direction about the pin 7 into the delivery position as shown in FIGURE 8.

At the beginning of the pivoting of the swinging trough 4 out of its loading position, the rear face of the roller 19, rotating with the arm 17 about the pin 7, comes withing the range of movement of the rod 49. During the further rotation, the locking bolt 29, moving with the swinging trough 4, comes out of the groove 44 in the rod as a result of which the locking of the control linkage 37, 49, 55 is released and the rod 49 is urged forwards under the pressure of the spring 54 until it strikes against the rear end face of the roller 19. At the same time, the rod 37 is moved back a short distance so that the plane in which the axis of the locking bolt 29 rotates with the swinging trough 4 no longer coincides with the plane of symmetry of the rod groove 44. During the further pivoting of the swinging trough into the delivery position and back towards the loading position, the rod 49 bears against the roller 19. Shortly before the swinging trough 4 has reached the loading position again, the locking bolt 29 impinges on the rod 37 but cannot engage in its groove 44 because this is situated somewhat behind it. While the locking bolt 29 is pushed back into the sleeve 28 by the rod 37 as the swinging trough 4 enters its end position, the roller 19 passes out of the range of movement of the rod 49. This is now moved forwards by the spring 54 until the ring 52 strikes against the bracket 50. At the same time, the rod 37 with the rammer 39 travels back into the position illustrated in FIGURE 3 whereupon, after it has swung back into the position shown in chain line in FIGURE 6, the trough 35 is again free for the introduction of a further rocket.

When the magazine is fully loaded, the last rocket 12 stacked therein, seen in the direction of conveying, is lying on the swinging trough 4. The set screw 45 is now screwed in further and brought into engagement with the bore 46 in the rod 37 so that this, and also the remaining parts 49, 55 of the control linkage, as well as the rammer 39, are located in the position illustrated in FIGURE 2.

By this means, the rammer 39 is prevented from being displaced towards the rear during the movement of the feed mechanism which begins after the firing of the first rocket 12 present in the loading chamber of the launcher and tilting of the swinging trough 4 in the manner described above, and the arm 17 of the positively driven swinging trough 4 is prevented from running against the rod 49, which now remains in the position shown in FIGURE 3, after the firing of the second rocket, as a result of which the feed mechanism would be jammed.

Before the magazine is re-loaded, the locking of the control linkage 37, 49, 55 is released by unscrewing the set screw 45 into its release position. If the swinging trough 4 is not then in a position in which the rammer 39 can spring back into the position illustrated in FIGURE 3, the feed mechanism is displaced by means of the crank handle until the swinging trough 4 has reached this position.

I claim:

1. A rocket launcher magazine for rockets comprising a feed mechanism to convey said rockets inside said magazine, a driving shaft for said feed mechanism, a first and a second cam fastened on said driving shaft, a pivoting loading trough set parallel to said rockets in said magazine having a loading position and a delivery position so that said rockets move onto said loading trough when in said loading position and are delivered from said loading trough when in said delivery position to said feed mechanism, said loading trough having a supporting surface and a pivoting arm, said supporting surface engaging said first cam when said loading trough is in said loading position and said pivoting arm engaging said second cam when pivoting said loading trough into said delivery position.

2. A rocket launcher magazine as set forth in claim 1 wherein said magazine has a loading aperture with a fixed trough in front of said loading aperture so that said fixed trough has a coaxial position in relation to said pivoting loading trough when in said loading position.

References Cited

UNITED STATES PATENTS

| 1,682,323 | 8/1928 | Conlon | 89—47 |
| 2,933,020 | 4/1960 | Hammer | 89—45 |
| 3,186,303 | 6/1965 | Linke et al. | 89—1.803 |

SAMUEL W. ENGLE, Primary Examiner

U.S. Cl. X.R.

89—1.803, 45